United States Patent
Chen et al.

(10) Patent No.: US 11,514,851 B1
(45) Date of Patent: Nov. 29, 2022

(54) DISPLAY DEVICE AND RELATED DRIVER

(71) Applicant: QISDA CORPORATION, Taoyuan (TW)

(72) Inventors: Chi-Jen Chen, Taoyuan (TW); Wei-Chun Huang, Taoyuan (TW); Sung-Po Yeh, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/703,938

(22) Filed: Mar. 24, 2022

(30) Foreign Application Priority Data

Jan. 25, 2022 (CN) .......................... 202210087227.9

(51) Int. Cl.
  *G09G 3/32* (2016.01)
  *H04N 9/31* (2006.01)
(52) U.S. Cl.
  CPC ............. *G09G 3/32* (2013.01); *H04N 9/3182* (2013.01); *G09G 2320/0626* (2013.01); *G09G 2320/0666* (2013.01)
(58) Field of Classification Search
  CPC .......... H04N 9/64; H04N 9/73; G09G 3/3426; G09G 3/3406; G09G 3/3413; G09G 3/2003; G09G 3/2011; G09G 2320/0242; G09G 2320/0626; G09G 2320/0666; G09G 2320/0646; G09G 5/02; G09G 5/10
  See application file for complete search history.

(56) References Cited

U.S. PATENT DOCUMENTS

| | | | |
|---|---|---|---|
| 2005/0254022 A1* | 11/2005 | Kang ................... | H04N 9/3117 353/122 |
| 2009/0002577 A1* | 1/2009 | Watanabe .............. | G03B 33/08 349/5 |
| 2016/0111048 A1* | 4/2016 | Matsui .................. | G01J 1/4209 250/206 |
| 2017/0208300 A1* | 7/2017 | Toyooka .............. | H04N 9/3155 |

\* cited by examiner

*Primary Examiner* — Dong Hui Liang

(57) ABSTRACT

A display device includes a first luminescent device, a second luminescent device, a multi-color strobe decoder, a pseudo signal circuit and a single-color driving circuit. The multi-color strobe decoder is configured to generate two gate control signals. The second luminescent device and the pseudo signal circuit are coupled to the multi-color strobe decoder. The single-color driving circuit is coupled to the first luminescent device and the multi-color strobe decoder. When the single-color driving circuit provides first current for driving the first luminescent device according to the first gate control signal and/or a brightness enhancing signal, the pseudo signal circuit is configured to couple a first bias voltage to the multi-color strobe decoder according to the first gate control signal. When the second gate control signal drives the second luminescent device, the second luminescent device is configure to couple a second bias voltage to the multi-color strobe decoder.

20 Claims, 2 Drawing Sheets

DISPLAY DEVICE AND RELATED DRIVER

BACKGROUND OF THE INVENTION

1. Field of the Invention

The present invention is related to a display device and related driver, and more particularly, to a display device and related driver capable of enhancing brightness.

2. Description of the Prior Art

With rapid development in technology, more and more multi-function projectors are available in daily life. There are many types of projectors, such as digital light processing (DLP) projectors, 3 liquid crystal display (3LCD) projectors and liquid crystal on silicon (LCOS) projectors. DLP projectors developed by Texas Instruments (TI) have become most widely due to high contrast, small size and sharp images.

The operation of a DLP projector is based on the micro-electromechanical systems (MEMS) technology in which digital micro-mirror device (DMD) is used to perform high speed, efficient, and reliable spatial light modulation for displaying predetermined images. However, the image brightness of current DLP projectors is limited by TI systems. For example, the duty cycle of the driving signal for each color must conform to TI specification. Therefore, current DLP projectors are unable to meet the requirements in high-brightness application.

SUMMARY OF THE INVENTION

The present invention provides a display device which includes a first luminescent device, a multi-color strobe decoder, a second luminescent device coupled to the multi-color strobe decoder, a pseudo signal circuit coupled to the multi-color strobe decoder, and a single-color driving circuit coupled to the first luminescent device and the multi-color strobe decoder. The multi-color strobe decoder is configured to output a first gate control signal and a second gate control signal. When the single-color driving circuit provides first current according to the first gate control signal and/or a brightness enhancing signal for driving the first luminescent device, the pseudo signal circuit is configured to couple a first bias voltage to the multi-color strobe decoder. When the second gate control signal is used to drive the second luminescent device, the second luminescent device is configure to couple a second bias voltage to the multi-color strobe decoder.

The present invention also provides an LED driver which includes a multi-color strobe decoder, a pseudo signal circuit coupled to the multi-color strobe decoder, and a single-color driving circuit coupled to the first luminescent device and the multi-color strobe decoder. The multi-color strobe decoder is configured to output a first gate control signal for driving a first luminescent device and receive a first bias voltage when driving the first luminescent device; and output a second gate control signal for driving a second luminescent device and receive a second bias voltage from the second luminescent device when driving the second luminescent device. When the single-color driving circuit provides first current according to the first gate control signal and/or a brightness enhancing signal for driving the first luminescent device, the pseudo signal circuit is configured to couple the first bias voltage to the multi-color strobe decoder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
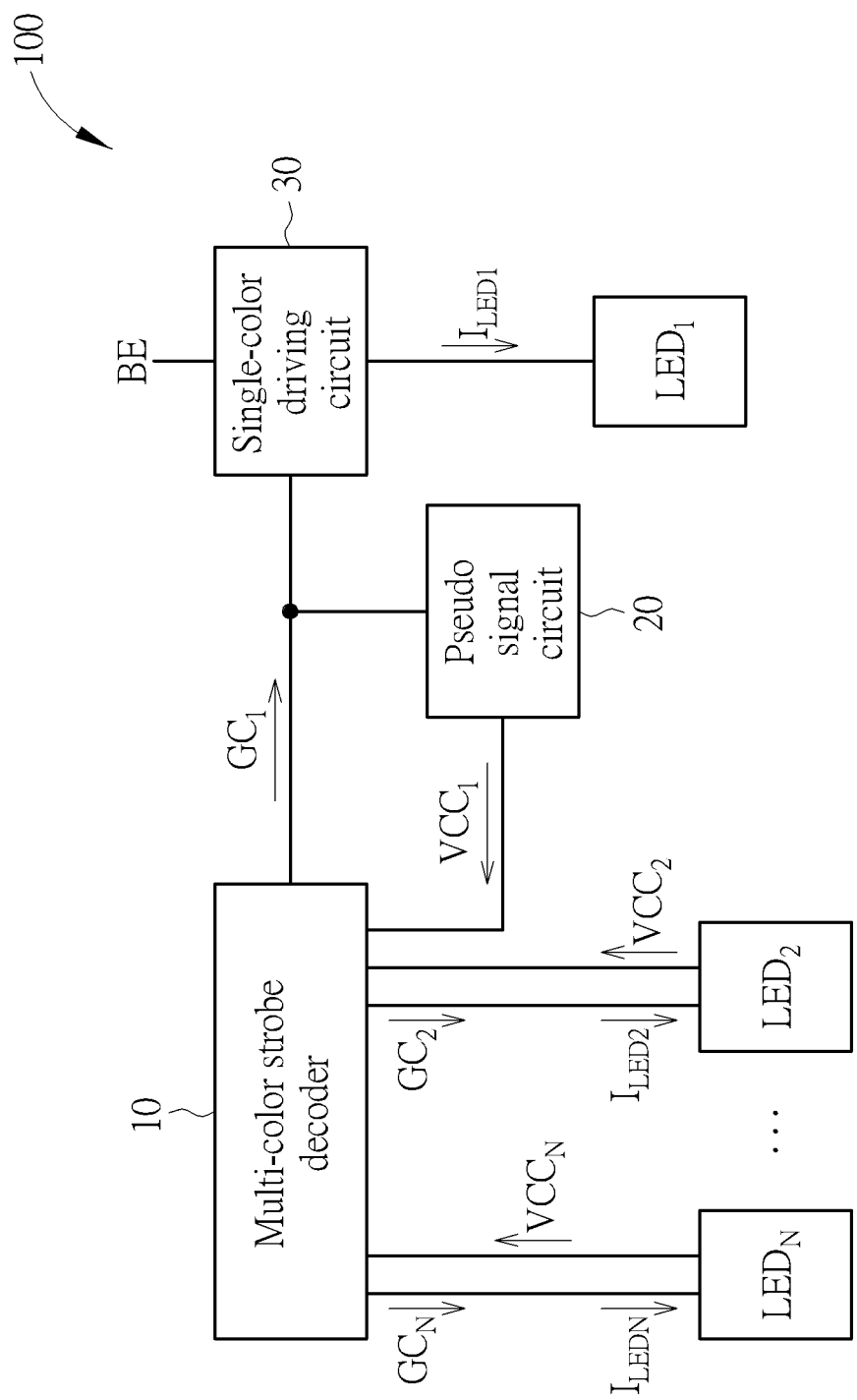
FIG. 1 is a functional diagram illustrating a display device according to an embodiment of the present invention.

FIG. 1 is a functional diagram illustrating a display device 100 according to an embodiment of the present invention. The display device 100 includes a multi-color strobe decoder 10, a plurality of luminescent devices $LED_1$-$LED_N$, a pseudo signal circuit 20, and a single-color driving circuit 30, wherein N is an integer larger than 1. The multi-color strobe decoder 10 is configured to output gate control signals $GC_1$-$GC_N$ for respectively driving the luminescent devices $LED_1$-$LED_N$ and receive bias voltages $VCC_1$-$VCC_N$ when the luminescent devices $LED_1$-$LED_N$ have been successfully illuminated, wherein the bias voltage $VCC_1$ is provided via the pseudo signal circuit 20 and the bias voltages $VCC_2$-$VCC_N$ are provided via the luminescent devices $LED_2$-$LED_N$, respectively. When the luminescent devices $LED_1$-$LED_N$ are illuminated, $I_{LED1}$-$I_{LEDN}$ respectively represent the current flowing through the luminescent devices $LED_1$-$LED_N$. The display device 100 may be implemented in a DLP projector, but does not limit the scope of the present invention.

The single-color driving circuit 30, coupled to the luminescent device $LED_1$ and the multi-color strobe decoder 10, is configured to provide the current $I_{LED1}$ according to the gate control signal $GC_1$ and/or a brightness enhancing signal BE for driving the luminescent device $LED_1$. The pseudo signal circuit 20 is coupled to the multi-color strobe decoder 10. When the single-color driving circuit 30 provides the current $I_{LED1}$ according to the gate control signal $GC_1$ and/or a brightness enhancing signal BE for driving the luminescent device $LED_1$, the pseudo signal circuit 20 is configured to couple the bias voltage $VCC_1$ to the multi-color strobe decoder 10.

In the present invention, each of the luminescent devices $LED_1$-$LED_N$ may adopt a single LED or multiple LEDs coupled in series, in parallel or formed in an array. The above-mentioned LEDs may consist of single-junction LEDs, multi-junction high-voltage (HV) LEDs, LEDs in various sizes, mini LEDs, micro LEDs, or any combination of LEDs in various types, sizes and colors. However, the types and configurations of the luminescent devices $LED_1$-$LED_N$ do not limit the scope of the present invention.

Figure 2:
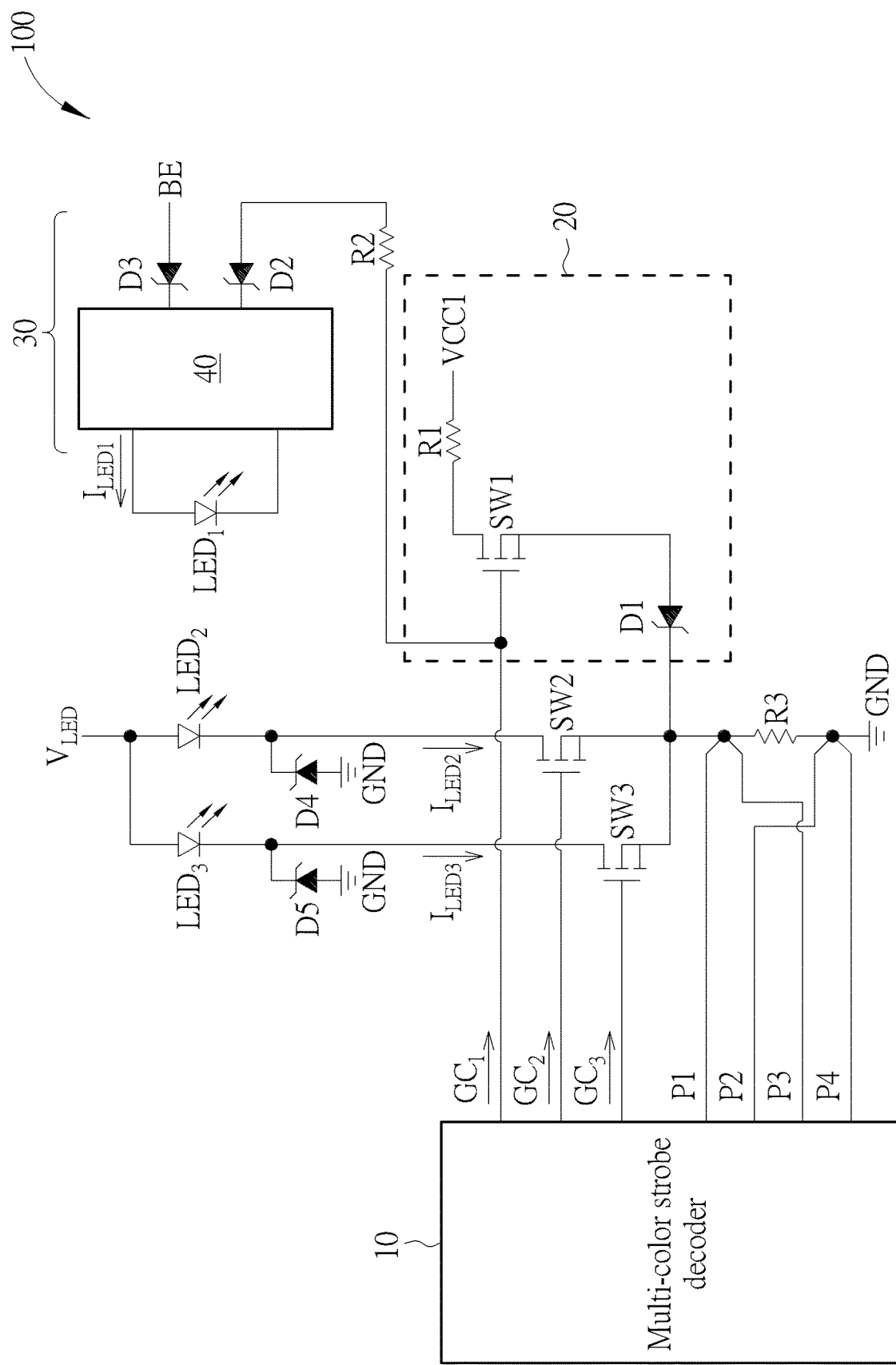
FIG. 2 is a diagram illustrating an implementation of the display device according to an embodiment of the present invention.

FIG. 2 is a diagram illustrating an implementation of the display device 100 according to an embodiment of the present invention. For illustrative purposes, FIG. 2 depicts the embodiment of N=3 in which the display device 100 includes three luminescent devices $LED_1$-$LED_3$ and the multi-color strobe decoder 10 outputs three gate control signals $GC_1$-$GC_3$ for respectively driving the luminescent devices $LED_1$-$LED_3$. In an embodiment, the luminescent device $LED_1$ includes one or multiple green LEDs, the luminescent device $LED_2$ includes one or multiple red LEDs, and the luminescent device $LED_3$ includes one or multiple blue LEDs. In an embodiment, each of the luminescent devices $LED_1$-$LED_3$ may include one among one or multiple green LEDs, one or multiple red LEDs and one or multiple blue LEDs without repetition. However, the types and configurations of the LEDs adopted in the luminescent devices $LED_1$-$LED_N$ do not limit the scope of the present invention.

In the embodiment illustrated in FIG. 2, the multi-color strobe decoder 10 includes current-sensing pins P1-P4. The current-sensing pins P1 and P3 are coupled to the first end of a resistor R3. The current-sensing pins P2 and P4 are coupled to the second end of the resistor R3. The second end of the resistor R3 is coupled to a ground voltage GND. In an embodiment, the resistor R3 could be a sensing resistor for the on-current of the luminescent devices $LED_1$.

In the embodiment illustrated in FIG. 2, the pseudo signal circuit 20 includes a resistor R1, a diode D1 and a switch SW1. The switch SW1 includes a first end coupled to the bias voltage $VCC_1$ via the resistor R1, a second end coupled to the anode of the diode D1, and a control end coupled to the multi-color strobe decoder 10 for receiving the gate control signal $GC_1$. The cathode of the diode D1 is coupled to the current-sensing pins P1 and P3 of the multi-color strobe decoder 10. During the illumination period of the luminescent device $LED_1$, the multi-color strobe decoder 10 is configured to output the gate control signal $GC_1$ having an enable level. Under such circumstance, the switch SW1 is turned on, and the pseudo signal circuit 20 may couple the bias voltage $VCC_1$ to the current-sensing pins P1 and P3 of the multi-color strobe decoder 10

In the embodiment illustrated in FIG. 2, the single-color driving circuit 30 includes diodes D2-D3 and a current source circuit 40. The diode D2 includes an anode coupled to the multi-color strobe decoder 10 via a resistor R2 for receiving the gate control signal $GC_1$ and a cathode coupled to the current source circuit 40. The diode D3 includes an anode coupled to the brightness enhancing signal BE and a cathode coupled to the current source circuit 40. The current source circuit 40 may receive the gate control signal $GC_1$ via the diode D2 and/or the brightness enhancing signal BE via the diode D3. The current source circuit 40 is configured to provide the current $I_{LED1}$ according to the gate control signal $GC_1$ or the brightness enhancing signal BE for driving the luminescent device $LED_1$.

In the embodiment illustrated in FIG. 2, the display device 100 further includes switches SW2-SW3 and diodes D4-D5. The switch SW2 includes a first end coupled to the cathode of the luminescent device $LED_2$, a second end coupled to the current-sensing pin P1, and a control end coupled to the multi-color strobe decoder 10 for receiving the gate control signal $GC_2$. The switch SW3 includes a first end coupled to the cathode of the luminescent device $LED_3$, a second end coupled to the current-sensing pin P1, and a control end coupled to the multi-color strobe decoder 10 for receiving the gate control signal $GC_3$. The diode D4 includes an anode coupled to the ground voltage GND and a cathode coupled to the cathode of the luminescent device $LED_2$. The diode D5 includes an anode coupled to the ground voltage GND and a cathode coupled to the cathode of the luminescent device $LED_3$. The switch SW2 is configured to selectively conduct the current $I_{LED2}$ based on the second gate control signal $GC_2$ for driving the luminescent device $LED_2$. The switch SW3 is configured to selectively conduct the current $I_{LED3}$ based on the gate control signal $GC_3$ for driving the luminescent device $LED_3$.

In a preferred embodiment, the resistor R3 may be composed of at least two resistors connected in series or equivalent resistors. Taking the resistors R31 and R32 connected in series as an example (not shown), the switch SW2 and the second end of the switch SW3 may be coupled between the resistors R31 and R32. The resistor R32 is used as a sensing resistor for the on-current $I_{LED2}$ and $I_{LED3}$ of the luminescent devices $LED_2$ and $LED_3$ for improving the sensitivity. The equivalent resistors of the resistors R31 and R32 form the resistor R3, and may be used as a sensing resistor for the on-current of the luminescent devices $LED_1$. However, this embodiment does not limit the scope of the present invention.

In the present invention, the switches SW1-SW3 may include metal oxide semiconductor field-effect transistors (FET), bipolar transistors (BJT), or any type of transistors. For N-type transistors, the enable level is logic 1; for P-type transistors, the enable level is logic 0. However, the type of the switches SW1-SW3 does not limit the scope of the present invention.

In the present invention, during the illumination period of the luminescent device $LED_1$ when receiving the gate control signal $GC_1$ having the enable level but not receiving the brightness enhancing signal BE corresponding to high-brightness applications, the single-color driving circuit 30 is configured to provide the current $I_{LED1}$ having a first duty cycle based on the gate control signal $GC_1$, wherein the first duty cycle conforms to the GI system limitations. During the illumination period of the luminescent device $LED_1$ when receiving the gate control signal $GC_1$ having the enable level and the brightness enhancing signal corresponding to high-brightness applications, the single-color driving circuit 30 is configured to provide the current $I_{LED1}$ having a second duty cycle based on the brightness enhancing signal BE, wherein the second duty cycle is larger than the first duty cycle. In an embodiment, the second duty cycle is full (100%) duty cycle wherein the luminescent device $LED_1$ is continuously illuminated for meeting the requirement of high-brightness applications.

On the other hand, during the illumination period of the luminescent device $LED_1$ when the multi-color strobe decoder 10 outputs the gate control signal $GC_1$ having the enable level, the pseudo signal circuit 20 is configured to couple the bias voltage $VCC_1$ to the current-sensing pins P1 and P3 of the multi-color strobe decoder 10 so as to inform that the luminescent device $LED_1$ has been illuminated. During the illumination period of the luminescent device $LED_2$ when the multi-color strobe decoder 10 outputs the gate control signal $GC_2$ having the enable level, the switch SW2 is turned on, which allows the current $I_{LED2}$ to flow through the luminescent device $LED_2$ and establish the bias voltage $VCC_2$ across the resistor R3. The bias voltage $VCC_2$ is then coupled to the current-sensing pins P1 and P3 of the multi-color strobe decoder 10 for informing that the luminescent device $LED_2$ has been illuminated. During the illumination period of the luminescent device $LED_3$ when the multi-color strobe decoder 10 outputs the gate control signal $GC_3$ having the enable level, the switch SW3 is turned on, which allows the current $I_{LED3}$ to flow through the luminescent device $LED_3$ and establish the bias voltage $VCC_3$ across the resistor R3. The bias voltage $VCC_3$ is then coupled to the current-sensing pins P1 and P3 of the multi-color strobe decoder 10 for informing that the luminescent device $LED_3$ has been illuminated.

In conclusion, in the display device 100 of the present invention, the pseudo signal circuit 20 can provide driving current with full duty cycle for driving a specific luminescent device (such as green luminescent device), and the pseudo signal circuit 20 can provide a corresponding bias voltage to inform that the specific luminescent device has been illuminated. Therefore, the present invention can meet the requirements in high-brightness application while conforming to TI system restrictions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:
   a first luminescent device;
   a multi-color strobe decoder configured to output a first gate control signal and a second gate control signal;
   a second luminescent device coupled to the multi-color strobe decoder;
   a pseudo signal circuit coupled to the multi-color strobe decoder; and
   a single-color driving circuit coupled to the first luminescent device and the multi-color strobe decoder, wherein:
      when the single-color driving circuit provides first current according to the first gate control signal and/or a brightness enhancing signal for driving the first luminescent device, the pseudo signal circuit is configured to couple a first bias voltage to the multi-color strobe decoder; and
      when the second gate control signal is used to drive the second luminescent device, the second luminescent device is configure to couple a second bias voltage to the multi-color strobe decoder.

2. The display device of claim 1, wherein:
   the multi-color strobe decoder includes:
      a first current-sensing pin;
      a second current-sensing pin coupled to a ground voltage;
      a third current-sensing pin coupled to the first current-sensing pin; and
      a fourth current-sensing pin coupled to the second current-sensing pin; and
   the pseudo signal circuit is further configured to couple the first bias voltage to the first current-sensing pin and the third current-sensing pin when the first gate control signal is at an enable level.

3. The display device of claim 2, further comprising:
   a second switch configured to selectively conduct second current based on the second gate control signal for driving the second luminescent device, and including:
      a first end coupled to a first end of the second luminescent device;
      a second end coupled to the first current-sensing pin; and
      a control end coupled to the multi-color strobe decoder for receiving the second gate control signal.

4. The display device of claim 3, wherein the multi-color strobe decoder is further configured to output a third gate control signal and the display device further comprises:
   a third luminescent device; and
   a third switch configured to selectively conduct third current based on the third gate control signal for driving the third luminescent device, and including:
      a first end coupled to a first end of the third luminescent device;
      a second end coupled to the first current-sensing pin; and
      a control end coupled to the multi-color strobe decoder for receiving the third gate control signal.

5. The display device of claim 4, further comprising a fifth diode which includes:
   an anode first end coupled to the ground voltage; and
   a cathode coupled between the first end of the third luminescent device and the first end of the third switch.

6. The display device of claim 3, further comprising a fourth diode which includes:
   an anode first end coupled to the ground voltage; and
   a cathode coupled between the first end of the second luminescent device and the first end of the second switch.

7. The display device of claim 2, wherein the pseudo signal circuit comprises:
   a first resistor;
   a first diode which includes:
      an anode; and
      a cathode coupled to the first current-sensing pin;
   a first switch which includes:
      a first end coupled to the first bias voltage via the first resistor;
      a second end coupled to the anode of the first diode; and
      a control end coupled to the multi-color strobe decoder for receiving the first gate control signal.

8. The display device of claim 7, wherein the single-color driving circuit comprises:
   a second diode which includes:
      an anode coupled to the multi-color strobe decoder for receiving the first gate control signal; and
      a cathode;
   a third diode which includes:
      an anode coupled to the brightness enhancing signal; and
      a cathode; and
   a current source circuit coupled to the cathode of the second diode and the cathode of the third diode for receiving the first gate control signal and/or the brightness enhancing signal and configured to provide the first current according to the first gate control signal or the brightness enhancing signal for driving the first luminescent device.

9. The display device of claim 8, further comprising a second resistor which includes:
   a first end coupled to the anode of the second diode; and
   a second end coupled to the multi-color strobe decoder for receiving the first gate control signal.

10. The display device of claim 2, further comprising a third resistor which includes:
    a first end coupled to the first current-sensing pin and the third current-sensing pin; and
    a second end coupled to the second current-sensing pin and the fourth current-sensing pin.

11. The display device of claim 1, wherein the first luminescent device includes a green light emitting diode (LED).

12. An LED driver, comprising:
    a multi-color strobe decoder configured to:
       output a first gate control signal for driving a first luminescent device and receive a first bias voltage when driving the first luminescent device;
       output a second gate control signal for driving a second luminescent device and receive a second bias voltage from the second luminescent device when driving the second luminescent device;
    a pseudo signal circuit coupled to the multi-color strobe decoder; and a single-color driving circuit coupled to the first luminescent device and the multi-color strobe decoder, wherein:
when the single-color driving circuit provides first current according to the first gate control signal and/or a brightness enhancing signal for driving the first luminescent device, the pseudo signal circuit is configured to couple the first bias voltage to the multi-color strobe decoder.

13. The LED driver of claim 12, wherein:
the multi-color strobe decoder includes:
a first current-sensing pin;
a second current-sensing pin coupled to a ground voltage;
a third current-sensing pin coupled to the first current-sensing pin; and
a fourth current-sensing pin coupled to the second current-sensing pin; and
the pseudo signal circuit is further configured to couple the first bias voltage to the first current-sensing pin and the third current-sensing pin when the first gate control signal is at an enable level.

14. The LED driver of claim 13, further comprising:
a second switch configured to selectively conduct second current based on the second gate control signal for driving the second luminescent device, and including:
a first end coupled to a first end of the second luminescent device;
a second end coupled to the first current-sensing pin; and
a control end coupled to the multi-color strobe decoder for receiving the second gate control signal.

15. The LED driver of claim 14, wherein the multi-color strobe decoder is further configured to output a third gate control signal and the LED driver further comprises:
a third switch configured to selectively conduct third current based on the third gate control signal for driving a third luminescent device, and including:
a first end coupled to a first end of the third luminescent device;
a second end coupled to the first current-sensing pin; and
a control end coupled to the multi-color strobe decoder for receiving the third gate control signal.

16. The LED driver of claim 15, further comprising a fifth diode which includes:
an anode coupled to the ground voltage; and
a cathode coupled between the first end of the third luminescent device and the first end of the third switch.

17. The LED driver of claim 14, further comprising a fourth diode which includes:
an anode first end coupled to the ground voltage; and
a cathode coupled between the first end of the second luminescent device and the first end of the second switch.

18. The LED driver of claim 13, wherein the pseudo signal circuit comprises:
a first resistor;
a first diode which includes:
an anode; and
a cathode coupled to the first current-sensing pin;
a first switch which includes:
a first end coupled to the first bias voltage via the first resistor;
a second end coupled to the anode of the first diode; and
a control end coupled to the multi-color strobe decoder for receiving the first gate control signal.

19. The LED driver of claim 18, wherein the single-color driving circuit comprises:
a second diode which includes:
an anode coupled to the multi-color strobe decoder for receiving the first gate control signal; and
a cathode;
a third diode which includes:
an anode coupled to the brightness enhancing signal; and
a cathode; and
a current source circuit coupled to the cathode of the second diode and the cathode of the third diode for receiving the first gate control signal and/or the brightness enhancing signal and configured to provide the first current according to the first gate control signal or the brightness enhancing signal for driving the first luminescent device.

20. The LED driver of claim 19, further comprising a second resistor which includes:
a first end coupled to the anode of the second diode; and
a second end coupled to the multi-color strobe decoder for receiving the first gate control signal.

* * * * *